United States Patent [19]

Einsle

[11] Patent Number: 4,474,638

[45] Date of Patent: Oct. 2, 1984

[54] DEVICE FOR MANUFACTURING ELECTRICAL AND OPTICAL CABLES

[75] Inventor: Günter Einsle, Munich, Fed. Rep. of Germany

[73] Assignee: Siemens Aktiengesellschaft, Berlin & Munich, Fed. Rep. of Germany

[21] Appl. No.: 462,011

[22] Filed: Jan. 28, 1983

[30] Foreign Application Priority Data

Feb. 26, 1982 [DE] Fed. Rep. of Germany ....... 3207083

[51] Int. Cl.³ .............................................. B29D 11/00
[52] U.S. Cl. ........................... 156/494; 156/244.12; 156/500; 264/1.5; 425/111; 425/114
[58] Field of Search ............... 425/111, 113, 114, 92, 425/97, 102; 264/1.5, 174; 156/244.12, 244.24, 494, 500

[56] References Cited

U.S. PATENT DOCUMENTS

| 2,932,323 | 4/1960 | Ariet | 156/244.12 |
| 4,154,783 | 5/1979 | Jackson | 264/1.5 |
| 4,172,106 | 10/1979 | Lewis | 264/174 |
| 4,303,734 | 12/1981 | Sullivan | 156/500 |
| 4,409,154 | 10/1983 | Trenat | 264/1.5 |

FOREIGN PATENT DOCUMENTS

| 2523843 | 10/1979 | Fed. Rep. of Germany . | |
| 50-13956 | 5/1975 | Japan | 264/1.5 |
| 1203138 | 8/1970 | United Kingdom | 264/174 |
| 1448130 | 9/1976 | United Kingdom | 264/1.5 |
| 1526777 | 9/1978 | United Kingdom | 264/1.5 |

Primary Examiner—James Lowe
Attorney, Agent, or Firm—Hill, Van Santen, Steadman & Simpson

[57] ABSTRACT

A device for manufacturing electrical and/or optical cables which contain either one or more electrical and/or optical leads which are received with a filling compound in an outer casing or jacket characterized by an extruder for extruding the jacket, an arrangement for inserting each of the leads through a guide tube into the extruded outer casing and providing a second concentrically arranged tube for receiving and transferring the filling material for discharge around the guide tube into the extruded jacket. Preferably, the extruding device also includes an arrangement for stretching the tube to a reduced diameter with a conical-shaped zone or cone extending between the extruded casing and the stretched casing and the guide tube and the filling or second tube extend into this zone or cone.

13 Claims, 2 Drawing Figures

DEVICE FOR MANUFACTURING ELECTRICAL AND OPTICAL CABLES

BACKGROUND OF THE INVENTION

The present invention is directed to a device for manufacturing an electrical and/or optical cable having at least one electrical and/or optical lead arranged in an outer casing with a filling material which device includes an extruder for extruding the outer casing, an arrangement for introducing the filling material into the extruded casing while the leads are being introduced into the extruded casing.

A device which extrudes an outer casing and fills the extruded casing with a filling compound as the leads are introduced therein is disclosed by German AS No. 25 23 843. The filling device and the following extruder are thereby designed as independent units and the cable core is provided with the filling compound and then proceeds free from the end of the filling device and without guidance to the following extruder. With the cores containing very sensitive leads, this device can lead to problems because a danger exists that extremely high stresses will be placed on the leads in the area of the extruder. Another disadvantage of this arrangement is to be seen in that the filling of the cable core occurs relatively early in the process and it must be guaranteed by means of additional measures that the filling compound does not run off or is not stripped from the cable.

SUMMARY OF THE INVENTION

The present invention is directed to an improved device for inserting leads with a filling compound into an outer casing, which device is a compact device and at the same time reduces to a minimum any stress placed on the leads. This is inventively accomplished by an improvement in a device having means for extruding an outer casing, means for introducing each of the leads into said casing as it is extruded and filling means for supplying a filling compound into the casing with the leads. The improvement comprises the means for introducing including a guide tube through which the leads are introduced, said guide tube extending through the filling means and through the means for extruding and a second tube surrounding the guide tube, said second tube extending from the filling means at least to said means for extruding, said second tube receiving the filling compound and conveying it along the guide tube for discharge into the freshly extruded casing.

Since the leads are conducted through the extruder in the guide tube, they can neither contact the extrusion head nor can a knot, which leads to tearing, be formed on the leads at the discharge from the extruder. Another particular advantage of the device of the present invention consists therein that the leads proceed largely centrally in the inside of the casing because the guide tube is received within the filling tube for the filling compound. It is therefore particularly expedient for both tubes to proceed concentrically relative to one another and that they are also concentrically disposed relative to a stretching cone which is formed by stretching the freshly extruded casing to a reduced diameter.

DESCRIPTION OF THE PREFERRED EMBODIMENTS

Figure 1:
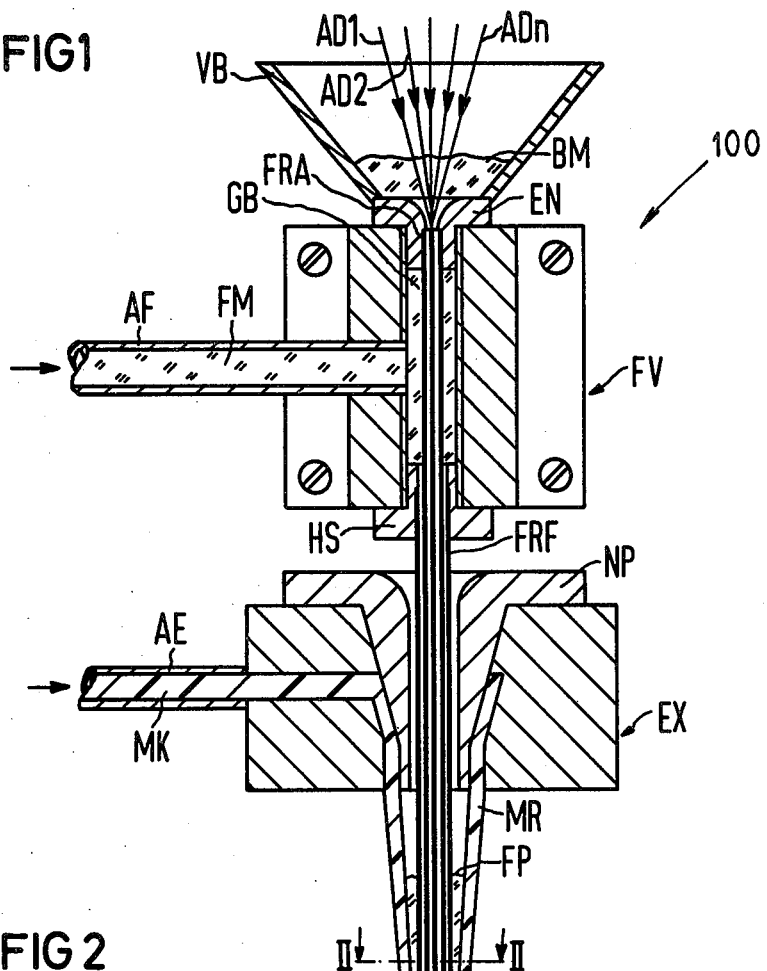
FIG. 1 is a longitudinal cross-section through a device of the present invention.

The principles of the present invention are particularly useful in the device generally indicated at 100 in FIG. 1 and includes extruder EX which has means for extruding an outer casing MA, filling means FV for inserting or filling the tube MA with a filling compound and means, which include a guide tube FRA, for introducing one or more leads AD1-ADn into the interior of the casing MA.

A series of leads AD1-ADn are illustrated in FIG. 1 and are supplied to an introduction nipple EN. The payout device and potential stranding devices are not shown in greater detail and can exhibit a standard structure. It is likewise not absolutely necesssary that a stranding of the individual leads be executed. Under certain conditions, it almost suffices that a single lead is inserted into the introduction nipple EN. The invention can be applied with the desired advantage in cases in which sensitive leads AD1-ADn are to be processed. This may be true with fiber-like light waveguides being introduced into an optical cable. An advantage in some instances is to carry out a preliminary moistening of the leads. A reservoir VB, which contains a compound BM serving for moistening, is provided and is arranged for this purpose on the intake nipple EN. This moistening does not occur under pressure but rather pressure-free and guarantees that the filling material FM to be supplied later under pressure will adhere to the leads better and seals with a bubble-free arrangement.

The introduction nipple EN is provided with an outside thread and is threaded into a bore GB of the filling means or device FV. A filling compound FM is supplied under corresponding pressure to the filling device FV by a connecting sleeve AF. A locking screw HS is screwed in an output or outlet end of the threaded bore GB and the flange-like projection of the locking screw HS accepts and retains a filling tube or second tube FRF. The end face of this filling tube FRF is opened toward the inside space of the threaded bore GB which is filled with the filling compound so that a correspondingly low viscous filling compound FM is pressed into the inside of the filling tube FRF. At the same time, a guide tube FRA is provided and extends concentrically through the filling tube FRF. As mentioned hereinabove, the inward or input end of the tube FRA is secured in the introduction nipple EN and the nipples EN and HS close off the threaded bore GB to form a pressure chamber for the filling material. Since the guide tube FRA for the individual leads AD1 through ADn is sealed at its end face relative to the filling compound FM, no filling compound can proceed into the guide tube FRA and the individual leads AD1 through ADn can slide easily and largely friction-free along the inside wall of the tube FRA.

The filling device FV is followed by the extruder EX which is provided with a connecting sleeve AE through which the synthetic compound MK serving for the formation of the casing MA of the cable is supplied under corresponding pressure and is at a desired temperature. The extruder EX has an annular extrusion nozzle which is formed in part by a nipple NP. This extrusion nozzle has a passageway that starts to converge into the annular extrusion opening through which the initial thick wall, large diameter casing is extruded.

Subsequent to extrusion from the extruder, the extruded cable or jacket are pulled by stretching means to the smaller diameter of the cable MA with the extension between the large diameter and the small diameter forming a converging conical cone or zone MR. Both the filling tube FRF and the guide tube FRA extend through a bore in the nipple NP and terminate in the converging cone MR of the extruded casing material. The filling compound FM emerging from an end of the filling tube FRF forms a filling surface FP whose end face as viewed in the processing direction lies in front of the terminal end face of the filling tube FRF. It is thereby guaranteed that the filling material is always present in a sufficient degree and that the filling of the cable core can occur without any inclusion of air or other gas. This operation is facilitated by means of repeat moistening with the compound BM. It is expedient in this context that the diameter of the stretching cone MR in the area of the exit location of the filling compound from the filling tube FRF is greater than the outside diameter of the end face of the filling tube. It is guaranteed by so doing that the filling compound can proceed toward the top up to the enlarged filling surface FP. Moroever, the advantages derived by the stretching of the jacket in the cone area is not impaired or respectively, decelerated, and under certain conditions, deformed by the end face of the filling tube FRF.

The guide tube FRA, which has the leads AD1 through ADn, is advantageously designed so that it does not terminate until after it extends past the end of the filling tube FRF. As a result, the guidance of the leads is assured over an even longer path and, moreover, fewer difficulties need be feared due to the flow of the filling compound because it can still move along the outer surface of the guide tube FRA after it exits the filling tube FRF.

Figure 2:
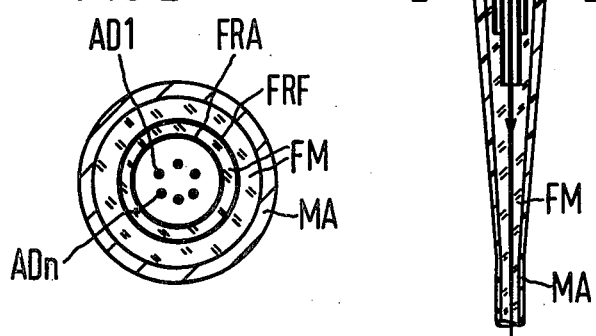
FIG. 2 is a cross-sectional view taken along the lines II—II of FIG. 1.

This arrangement is best illustrated in FIG. 2 wherein the six leads AD1-ADn are freely received in the guide tube FRA. The guide tube FRF has filling material extending between it and the guide tube FRA and also between it and the inside surface of the stretching cone MR of the converging conical portion.

Expediently, the filling tube FRF is structurally connected to the locking screw HS, for example, by means of soldering and can thus be replaced together with this locking screw in a simple manner. Thus, different cable types can be correspondingly manufactured by means of employing different tubes having different diameters. In an analogous manner, the guide tube FRA is also structurally connected to the introduction nipple EN to form a unit so it can be easily adapted to different numbers of leads by means of changing the introduction nipple EN together with the guide tube FRA that is associated therewith.

The moistening compound BM and the filling material FM can each comprise a petroleum jelly. The material MK for the outer casing MA can comprise a trifluorochloroethylene copolymer.

Although various minor modifications may be suggested by those versed in the art, it should be understood that I wish to embody within the scope of the patent granted hereon, all such modifications as reasonably and properly come within the scope of my contribution to the art.

I claim:

1. In a device for manufacturing a cable having at least one lead received with a filling compound in an outer casing, said device including means for extruding an outer casing having an annular extrusion opening being formed by a nipple with a bore received in an outer member, means for introducing each of the leads into said casing as it is extruded and filling means for supplying a filling compound into said casing with said leads, the improvements comprising the means for introducing leads including a guide tube through which the leads are introduced, said guide tube extending through the filling means and through the nipple and opening of the means for extruding, and a second tube surrounding the guide tube, said second tube extending from the filling means at least through the nipple and opening of said means for extruding, said second tube receiving the filling compound and conveying it along the guide tube for discharge into the freshly extruded casing.

2. In a device according to claim 1, wherein the guide tube and the second tube are disposed in a concentric relation to each other.

3. In a device according to claim 1, wherein the second tube terminates before the guide tube when taken in the direction of the flow for the device.

4. In a device according to claim 1, wherein the means for extruding extrudes a casing and includes means for stretching the casing into a reduced diameter with a converging conical-shaped cone therebetween, and the guide tube and the second tube both terminate in the area of the converging conical-shaped cone.

5. In a device according to claim 1, wherein the second tube is attached to an output of the filling means.

6. In a device according to claim 5, wherein the second tube is secured on a screw-type connector threadably received on the output of the filling means.

7. In a device according to claim 1, wherein the guide tube is attached to an introduction nipple which is threadably received in the input of the filling means.

8. In a device according to claim 1, which includes means for applying a moistening compound on the leads as they are introduced into the beginning of the guide tube.

9. In a device according to claim 8, wherein said means for introducing a moistening compound comprises a reservoir surrounding the input end of the guide tube.

10. In a device according to claim 9, wherein the guide tube is secured on an introduction nipple, said introduction nipple being threaded into an inlet side of the filling means and said reservoir being secured onto said introduction nipple.

11. In a device according to claim 1, wherein the means for extruding extrudes a tubular-shaped casing and includes means for stretching the casing from the extruded size to a reduced size with a converging conical-shaped cone therebetween, said guide tube and second tube being disposed concentrically relative to each other to extend through said extruding means and terminators in the area of the converging conically-shaped cone.

12. In a device according to claim 11, wherein the second tube terminates between the end of the guide tube and the extrusion opening of the means for extruding.

13. In a device according to claim 1, wherein the guide tube and the second tube are concentrically arranged with the end of the guide tube extending past the end of the second tube.

* * * * *